Dec. 24, 1968    J. MARKS    3,417,491
EDUCATIONAL WORKBOOK
Filed April 29, 1966
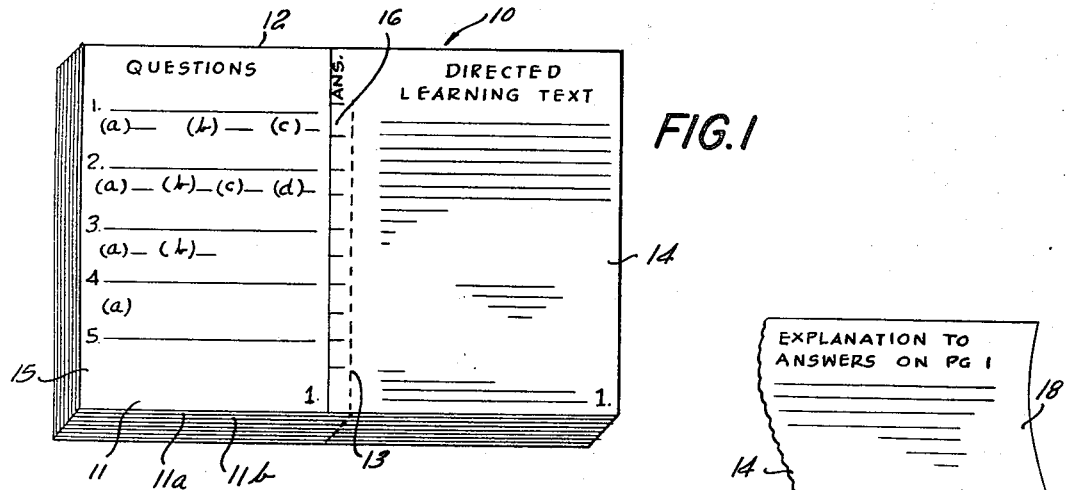
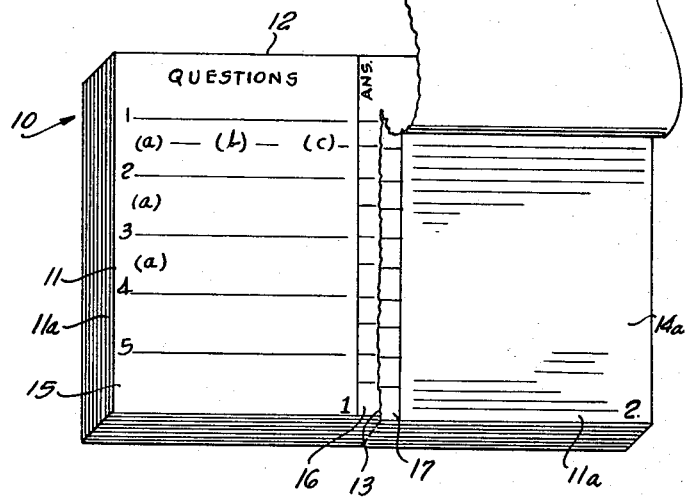
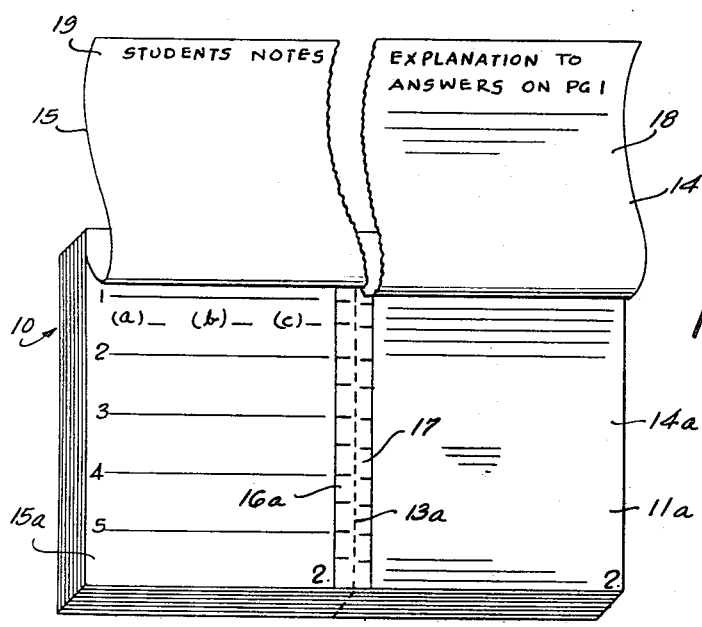
INVENTOR:
JOSEPH MARKS
BY Breitenfeld & Levine
ATTORNEYS

United States Patent Office

3,417,491
Patented Dec. 24, 1968

3,417,491
EDUCATIONAL WORKBOOK
Joseph Marks, 117—16 Park Lane S.,
Kew Gardens, N.Y. 11418
Filed Apr. 29, 1966, Ser. No. 546,223
6 Claims. (Cl. 35—9)

ABSTRACT OF THE DISCLOSURE

Book contains upper page having reading material on one side and questions on the other, a severable line between the sides, and a response area on the question side directly adjacent to the severable line. Lower page contains correct answers to questions in answer area located directly adjacent to severable line but on side of line opposite to response area. By tearing upper page and lifting reading material side, response area and answer area may be viewed in side-by-side relation.

---

This invention relates generally to an educational workbook and has particular reference to a self-correcting and self-checking educational device.

In an effort to improve the educational processes in recent years, new techniques and devices have been developed including so-called programed teaching devices which enable the student to essentially teach himself subject matter contained in the teaching device. In such devices, the subject matter is studied by the student, who then reads and answers a series of questions based on the studied material. The device usually provides means by which the student may thereafter check the correctness of his answers.

All the known teaching devices of the type described employ, in addition to the information-bearing pages, auxiliary components such as panels, flaps, or sliding devices to temporarily cover the correct answers, the panel or flap being manipulated by the student after he has answered the posed questions to reveal the correct answers. These auxiliary components increase the cost, bulk, and complexity of such teaching devices.

It is an object of the present invention to provide an educational workbook, by means of which the student can test, correct and consequently teach himself a great variety of subject matter, in which all the required equipment is integrally formed within the book itself.

It is a further object of this invention to provide an educational workbook which is far simpler in construction and in use than any of the known educational devices or workbooks.

It is also an object of this invention to provide an educational workbook in which no extraneous matter or element is needed to cover the correct answers, and in which the material of the book itself provides the necessary temporary covering for the correct answers.

In accordance with these objects, this invention provides a booklet comprising a plurality of pages which are bound together along their top edges. Each page is severable along a line intermediate the side edges of the page, such as by the provision of a line of perforations. Located on one side of the perforated line is reading material which the student is to study and learn. On the other side of the perforated line are a series of questions, preferably of the short answer type which can be answered by a single letter, number, word or phrase, these questions all relating to the subject matter of the reading material. A vertical column is provided adjacent the perforated line on the side containing the questions in which the student can insert his answers to the questions. Adjacent the perforated line, on the side containing the reading material, are the correct answers to the questions on the page above. Thus, after the student answers the questions on any page, by simply tearing the page along the perforated line, and then lifting the side containing the reading material, the column containing the correct answers is exposed to the student in a side-by-side relationship to his answers. The student can then readily compare the correct answers to his answers. The portion of the lower page which has been exposed by the lifting of the reading matter portion of the upper page, contains further reading matter for which questions are contained on the lower page directly beneath the questions on the upper page. Thus, by lifting the question portion of the upper page, questions on the lower page directed to the reading matter on the lower page are exposed. In this manner, the student may first study the first page of reading material, answer the questions provided in the column provided for the answers, and then lift up the portion of the first page containing the reading material to expose the correct answers. Once the answers have been compared and the student has studied the correct answers, he can then proceed to study the second page of reading material, lift up the portion of the first page containing questions and then answer the second page of questions. This process continues until all the pages have been studied and all the questions answered.

It is another feature of this invention to print on the rear face of the reading material portion of each page, an explanation of the correct answers to further assist the student in learning the subject matter by pointing out to him, with particularity, the reasons for the answers. In this way, the student does not merely learn simple factual answers, but is able to learn the context in which the facts are significant.

Other objects and features of this invention are illustrated by way of example in the accompanying drawings, in which:

FIG. 1 is a perspective view of an educational workbook illustrating principles of the present invention, the book being shown in its initial arrangement;

FIG. 2 is a perspective view of the workbook of FIG. 1 illustrating the manner in which the reading material side is torn at the perforations to expose a new page containing the next sequence of reading material and a column of correct answers to the questions on the upper page; and FIG. 3 is a perspective view of the workbook of FIGS. 1 and 2, illustrating the question side of the page lifted to expose the next sequence of questions directed to the next sequence of reading material.

With reference now to the figures, the educational workbook chosen to illustrate this invention is indicated generally by the numeral 10. The workbook is formed of a plurality of pages 11, 11a, 11b, etc. which are bound to one another along their top edges 12. Centrally located along each of the pages 11 is a vertical row of perforations 13, 13a, 13b, etc. Reading material relating to the subject matter to be learned is printed on the side 14 of page 11 disposed to the right of the row of perforations 13. On the side 15 of page 11, located to the left of the perforated line 13, questions relating to the subject matter on side 14 are printed. These questions may be of the multiple choice sort in which the student selects the correct answer from a choice of several offered to him, or it may be the insert type of question in which the answer consists of a single word or a phrase. Directly adjacent, and to the left of, the row of perforations 13 is a response column 16 in which the student places his answers to the questions on page side 15.

After the student has studied the text on side 14 and has placed his answers in column 16, he may then check the correctness of his answers by lifting side 14 and tearing page 11 along perforations 13, as shown in FIG. 2. It can be seen that on the side 14a of page 11a which lies directly beneath side 14 of page 11 there is provided a correct answer column 17 located directly adjacent, and to the right of, the severed row of perforations 13. From FIG. 2 it can be seen that the correct answer column 17 and the response column 16 lie directly adjacent to one another in a side-by-side relationship when page side 14 has been torn and raised to the position in FIG. 2. Consequently, the student can readily compare his responses in column 16 to the correct answers in column 17.

On the rear face 18 of page side 14, additional printed material is provided to explain the correct answers given in column 17 so that the student may understand the basis for the correct answers. It will be understood that the first page 11 of the book 10 will contain no answer column. However, each succeeding page side 14a, 14b, etc. will contain a correct answer column, such as 17, which will provide the correct answers to questions relating to the text material on the page directly above that answer column.

Once the student has compared his responses to the correct answers, he can proceed to study the material on side 14a of the second page 11a. Thereafter, he lifts page side 15, as shown in FIG. 3, to expose a new page side 15a on which is printed a series of questions relating to the text material on page 14a. Page 15a is also provided with a response column 16a in which the student's responses to questions on page 15a are to be placed. After the responses are placed in column 16a, side 14a is lifted by tearing along the perforations 13a to expose another correct answer column (not shown) like the column 17 in FIGS. 2 and 3. This answer column contains the correct answers to the questions on page side 15a, by which the student can check his responses placed in column 16a.

Space is provided on the real face 19 of page 14 to permit the student to write any notes relating to either the subject matter or to the questions on the previous page.

It can therefore be seen that the present invention provides a simple and inexpensive educational tool by means of which a student can study a subject by himself, and test and correct himself in a simple and expedient manner. Furthermore, there is provided in space 18 information by which a student can better understand the reason for the correct answers. Of primary importance is the fact that these benefits are achieved by means of a simple booklet which requires no member or component, in addition to the book pages, to temporarily conceal the correct answers to the questions posed in the book.

It should be obvious that various modifications can be made to the embodiment of the invention described and that such modifications can be made without departing from the spirit and scope of this invention as defined in the claims appended below.

What is claimed is:

1. An educational device comprising an upper page provided with reading material on one side and questions relating to said reading material on the other side, said upper page being severable along a line between said sides, the side of said upper page containing said questions including a response area directly adjacent to said severable line adapted to receive answers to the questions, and a separate lower page below said upper page, said pages being bound together along only one of their corresponding edges, said lower page bearing the correct answers to the questions in an answer area located directly adjacent to said severable line but on the side of said line opposite to the response area.

2. An educational device as defined in claim 1 wherein said pages are bound together at their top edges.

3. An educational device as defined in claim 2 wherein said severable line is defined by a row of perforations perpendicular to said binding.

4. An educational device as defined in claim 1 wherein the side of said lower page containing said answer area includes additional reading material, and the side of said upper page containing the questions can be raised, exposing a new set of questions relating to the additional reading material.

5. An educational device as defined in claim 4 wherein the rear face of the side of said upper page containing reading material is provided with explanations of the correct answers on said lower page.

6. An educational device as defined in claim 1 wherein said response and answer areas are in the form of adjacent columns parallel to said line of severance.

References Cited

UNITED STATES PATENTS

| 2,422,491 | 6/1947 | Lorber | 35—48.1 |
| 3,264,760 | 8/1966 | St. Clair | 35—48 |

EUGENE R. CAPOZIO, *Primary Examiner.*

WALTER W. NIELSEN, *Assistant Examiner.*

U.S. Cl. X.R.

35—48